(12) United States Patent
Nakamura et al.

(10) Patent No.: US 6,433,128 B2
(45) Date of Patent: Aug. 13, 2002

(54) PROCESS FOR PRODUCING OXYMETHYLENE COPOLYMER

(75) Inventors: Takahiro Nakamura; Akira Okamura; Masanori Furukawa; Isamu Masumoto; Kaneo Yoshioka; Kazumasa Maji, all of Yokkaichi (JP)

(73) Assignee: Mitsubishi Gas Chemical Co, Inc., Tokyo (JP)

( * ) Notice: Subject to any disclaimer, the term of this patent is extended or adjusted under 35 U.S.C. 154(b) by 0 days.

(21) Appl. No.: 09/855,781

(22) Filed: May 16, 2001

(30) Foreign Application Priority Data

May 22, 2000 (JP) ........................ 2000-150053
May 22, 2000 (JP) ........................ 2000-150054

(51) Int. Cl.$^7$ .............................................. C08G 10/02
(52) U.S. Cl. ...................... 528/241; 528/242; 528/244
(58) Field of Search ................................ 528/241, 242, 528/244

(56) References Cited

U.S. PATENT DOCUMENTS

| | | | | |
|---|---|---|---|---|
| 4,681,927 A | * | 7/1987 | Umemura et al. | 528/232 |
| 4,751,272 A | * | 6/1988 | Okita et al. | 525/398 |
| 4,814,424 A | * | 3/1989 | Suzumori et al. | 528/249 |
| 5,191,006 A | * | 3/1993 | Matsumoto et al. | 524/310 |
| 5,608,030 A | | 3/1997 | Hoffmockel et al. | |
| 5,688,897 A | * | 11/1997 | Tanimura et al. | 528/242 |
| 6,037,439 A1 | | 3/2001 | Kuniaki et al. | |

FOREIGN PATENT DOCUMENTS

| | | |
|---|---|---|
| EP | 0-325052 A | 7/1989 |
| EP | 0-568308 A | 11/1993 |
| EP | 0-789040 A | 8/1997 |
| JP | 08-059767 | 3/1996 |
| WO | WO 98-29483 | 7/1998 |

* cited by examiner

Primary Examiner—Samuel A. Acquah

(57) ABSTRACT

A process for producing an oxymethylene copolymer by polymerizing trioxan and 1,3-dioxolan in the presence of a cationically active catalyst, wherein (1) 1,3-dioxolan is used in an amount of 0.01 to 2.9 mol % based on trioxan; and (2) the cationically active catalyst is used in an amount of $1\times10^{-7}$ to $1.2\times10^{-4}$ mol based on 1 mol of trioxan. The process of the present invention makes it possible to obtain at a high yield an oxymethylene copolymer which has almost as high mechanical strength and stiffness as an oxymethylene homopolymer while retaining the tenacity and heat stability of an oxymethylene copolymer.

4 Claims, No Drawings

PROCESS FOR PRODUCING OXYMETHYLENE COPOLYMER

DETAILED DESCRIPTION OF THE INVENTION

1. Field of the Invention

The present invention relates to a process for producing an oxymethylene copolymer having high stiffness and tenacity and excellent heat stability at a high yield.

2. Prior Art

Oxymethylene polymers have excellent mechanical and thermal properties and have been used in an extremely wide variety of fields as typical engineering plastics in recent years. However, along with the expansion of the application field of the oxymethylene polymers, further improvement of the properties of the oxymethylene polymers as a material is desired. Currently, oxymethylene polymers available on the market are roughly divided into oxymethylene homopolymers and oxymethylene copolymers. The oxymethylene homopolymers have high mechanical strength and stiffness and excellent mechanical properties such as fatigue resistance and abrasion resistance but it is inferior in heat stability and hot water resistance. On the contrary, the oxymethylene copolymers are inferior in mechanical strength and stiffness but it is excellent in tenacity and flexibility and has high heat stability as it contains in the molecular chain a stable copolymerization unit which suppresses decomposition. An oxymethylene (co)polymer which has good balance among stiffness, tenacity and heat stability, making use of the characteristic properties of these two, has been desired.

To this end, it is conceivable to blend additives such as a reinforcing filler to improve the mechanical strength and stiffness of an oxymethylene copolymer. In this case, tenacity is greatly impaired. WO 98/29483 discloses an oxymethylene copolymer having high stiffness and such a structure that an oxyalkylene comonomer unit is inserted into a polymer chain consisting of an oxymethylene monomer unit at random in an amount of 0.01 to 1.0 mol based on 100 mols of the oxymethylene monomer unit. However, high stiffness is obtained with the above amount of the comonomer but a reduction in heat stability is large. Therefore, the above oxymethylene copolymer is still unsatisfactory in terms of balance between mechanical properties and heat stability.

JP-A 8-59767 (the term "JP-A" as used herein means an "unexamined published Japanese patent application") discloses that an oxymethylene copolymer produced from 1,3-dioxolan as a comonomer contains a smaller amount of an instable portion which is the cause of poor heat stability than an oxymethylene copolymer which contains ethylene oxide as a comonomer, the amount of the formed instable portion depends on the amount of 1,3-dioxolan and the amount of the catalyst used, and the amount of the catalyst must be reduced to a predetermined value or less to suppress the formation of the instable portion. However, heat stability is improved with the above amounts of 1,3-dioxolan and the catalyst but stiffness is not so improved.

Problems to be Solved by the Invention

It is known in the prior art that the means of improving polymerization yield is to increase the amount of a catalyst used but the formation of an instable portion is promoted simply by increasing the amount of the catalyst. However, the inventors of the present invention have studied the means and have found that an oxymethylene copolymer is obtained at a high yield without increasing the amount of a catalyst because the formation speed of the copolymer at the time of production is increased by using a certain amount or less of 1,3-dioxolan.

Further, as for the mechanical properties of an oxymethylene copolymer produced by using a specific amount of 1,3-dioxolan and a specific amount of a catalyst, stiffness as high as that of an oxymethylene homopolymer can be obtained and also tenacity as high as that of a conventional oxymethylene copolymer can be retained.

SUMMARY OF THE INVENTION

It is an object of the present invention to obtain at a high yield an oxymethylene copolymer having as high mechanical strength and stiffness as an oxymethylene homopolymer while retaining the tenacity and heat stability of an oxymethylene copolymer, making use of the characteristic properties of both the polyoxymethylene homopolymer and the oxymethylene copolymer.

Means for Solving the Problems

The inventors of the present invention have conducted intensive studies to attain the above object and have found that the above object can be obtained by using a specific amount of 1,3-dioxolan to be copolymerized with trioxan and a specific amount of a catalyst. The present invention has been accomplished based on this finding.

That is, according to the present invention, there is provided a process for producing an oxymethylene copolymer by polymerizing trioxan and 1,3-dioxolan in the presence of a cationically active catalyst, wherein (1) 1,3-dioxolan is used in an amount of 0.01 to 2.9 mol % based on trioxan and (2) the cationically active catalyst is used in an amount of $1 \times 10^{-7}$ to $1.2 \times 10^{-4}$ mol based on 1 mol of trioxan.

The process for producing an oxymethylene copolymer of the present invention will be described in further detail hereinunder.

Polymerization in the present invention is bulk polymerization or melt polymerization. Bulk polymerization which does not use a solvent substantially or quasi-bulk polymerization which uses a solvent in an amount of 20 wt % or less based on a monomer is preferred. This polymerization is used to polymerize the monomer in a molten state so as to obtain a bulk or powdered solid polymer along with the proceeding of polymerization.

The main raw material monomer in the present invention is trioxan which is a cyclic trimer of formaldehyde and 1,3-dioxolan is used as a comonomer. The amount of 1,3-dioxolan is 0.01 to 2.9 mol %, preferably 0.5 to 2.5 mol %, particularly 0.5 to 2.0 mol % based on trioxan. When the amount of 1,3-dioxolan is larger than 2.9 mol %, polymerization yield lowers and when the amount is smaller than 0.01 mol %, heat stability lowers.

In the present invention, 1,3-dioxolan is used as a comonomer in a relatively small amount based on trioxan and the cationically active catalyst is used in a specific ratio based on trioxan to attain the object.

That is, the cationically active catalyst is used in an amount of $1 \times 10^{-7}$ to $1.2 \times 10^{-4}$ mol, preferably $1 \times 10^{-7}$ to $1 \times 10^{-4}$ mol based on 1 mol of trioxan.

When the amount of the cationically active catalyst is larger than $1.2 \times 10^{-4}$ mol, the heat stability of the obtained copolymer may lower and when the amount is smaller than $1 \times 10^{-7}$ mol, polymerization yield may drop.

The cationically active catalyst used in the process of the present invention is a Lewis acid or protonic acid.

Examples of the Lewis acid include halides of boron, tin, titanium, phosphorus, arsenic and antimony, such as boron trifluoride, tin tetrachloride, titanium tetrachloride, phosphorus pentachloride, phosphorus pentafluoride, arsenic pentafluoride, antimony pentafluoride, and complex compounds and salts thereof. Examples of the protonic acid include esters of trifluoromethanesulfonic acid, perchloric acid and protonic acid, particularly esters of perchloric acid and lower fatty acid alcohols, and protonic anhydrides, particularly mixed anhydrides of perchloric acid and lower aliphatic carboxylic acids. In addition, triethyloxonium hexafluorophosphate, triphenylmethyl hexafluoroarsenate, acetylhexafluoroborate, heteropolyacid and acidic salts thereof, and isopolyacid and acidic salts thereof may also be used. Boron trifluoride, boron trifluoride hydrates and coordination complex compounds are preferred, and boron trifluoride diethyl etherate and boron trifluoride dibutyl etherate which are coordination complexes with ethers are the most preferred.

For the polymerization of the present invention, an appropriate molecular weight modifier may be used as required to adjust the molecular weight of the oxymethylene copolymer. Examples of the molecular weight modifier include carboxylic acids, carboxylic anhydrides, esters, amides, imides, phenols and acetal compounds. Phenol, 2,6-dimethylphenol, methylal and polyoxymethylene dimethoxide are preferred and methylal is the most preferred. The molecular weight modifier is used alone or in the form of a solution. When the molecular weight modifier is used in the form of a solution, an aliphatic hydrocarbon such as hexane, heptane or cyclohexane, aromatic hydrocarbon such as benzene, toluene or xylene, or hydrocarbon halide such as methylene dichloride or ethylene dichloride is used as a solvent.

The polymerizer used for the polymerization of the present invention may be of a batch or continuous system. A reactor equipped with a stirrer which is generally used may be used as a polymerizer of a batch system. Continuous polymerizers for trioxan which have been proposed heretofore, such as a kneader having great stirring power for coping with quick solidification or heat generation at the time of polymerization, fine temperature control function and self cleaning function for preventing the adherence of scales, twin-screw continuous extrusion kneader and twin-screw puddle type continuous mixer may be used. Two or more different types of polymerizers may be combined to be used.

For the polymerization of the present invention, it is important to control the polymerization temperature to achieve a polymerization yield of 60 to 90% (this range is referred to as "boundary yield"). This boundary yield is preferably 65 to 90%, more preferably 70 to 90%, the most preferably 80 to 90%. The polymerization temperature must be maintained at 60 to 115° C., preferably 60 to 110° C., more preferably 60 to 100° C., the most preferably 60 to 90° C. until the polymerization yield reaches the boundary yield. When the polymerization yield is higher than the boundary yield, the polymerization temperature must be maintained at 0 to 100° C., preferably 0 to 80° C., more preferably 0 to 70° C., the most preferably 0 to 60° C. When the polymerization temperature before the polymerization yield reaches the boundary yield is higher than 100° C., heat stability and polymerization yield lower. When the polymerization temperature is lower than 0° C., heat stability is maintained but the polymerization yield lowers. If the polymerization temperature when the polymerization yield is above the boundary yield is higher than 100° C., heat stability lowers and if the polymerization temperature is lower than 0° C., such inconvenience as an. increase in the torque of the stirring power of the polymerizer occurs. The polymerization temperature when the polymerization yield is above the boundary yield must not be higher than the temperature before the polymerization yield reaches the boundary yield. If the polymerization temperature is higher than the temperature, the heat stability of the obtained copolymer lowers.

The polymerization time in the present invention is connected with the amount of the catalyst and the polymerization temperature and not particularly limited but it is generally 0.25 to 120 minutes, particularly preferably 1 to 30 minutes.

The crude copolymer discharged from the polymerizer after polymerization is substantially completed must be mixed with and contacted to a deactivator immediately to deactivate the polymerization catalyst to terminate the polymerization reaction. In the present invention, the catalyst is deactivated to terminate polymerization when the polymerization yield reaches 90% or more, preferably 95% or more, more preferably 97% or more.

Examples of the deactivator which can be used in the present invention include trivalent organic phosphorus compounds, amine compounds, and, hydroxides of alkali metals and alkali earth metals. The amine compounds include primary, secondary and tertiary aliphatic amines, aromatic amines, heterocyclic amines, hindered amines and other known catalyst deactivators, such as ethylamine, diethylamine, triethylamine, mono-n-butylamine, di-n-butylamine, tri-n-butylamine, aniline, diphenylamine, pyridine, piperidine and morpholine. Out of these, trivalent organic phosphorus compounds and tertiary amines are preferred and triphenylphosphine is the most preferred.

When the deactivator is used in the form of a solution or suspension, the used solvent is not particularly limited, but aliphatic and aromatic organic solvents such as acetone, methyl ethyl ketone, hexane, cyclohexane, heptane, benzene, toluene, xylene, methylene dichloride and ethylene dichloride may be used in addition to water and alcohols.

The crude copolymer obtained by the above process is preferably a fine powder. To this end, a polymerization reactor preferably has the function of fully grinding a bulk polymer. Therefore, the deactivator may be added after the reaction product is ground by a grinder after polymerization, or grinding and agitation may be carried out at the same time in the presence of the deactivator. The reaction product is desirably ground until the grain size after grinding should become such that 100 wt % of the product passes through a 10-mesh sieve, 90 wt % or more passes through a 20-mesh sieve and 60 wt % or more passes through a 60-mesh sieve when the reaction product is sieved by a Ro-Tap shaker as a standard sieve. When grinding is not carried out to that extent, a reaction between the deactivator and the catalyst may not complete and depolymerization may gradually proceed with the residual catalyst, thereby reducing the molecular weight.

Since the copolymer which has been subjected to the deactivation of the polymerization catalyst is obtained at a high yield in the present invention, it can be supplied to the subsequent stabilization step directly. If the copolymer must be further purified, it may be subjected to cleaning, the separation and recovery of the unreacted monomer and drying.

In the stabilization step, the following stabilization methods (1) and (2) may be employed:

(1) a method in which the obtained oxymethylene copolymer is molten by heating to remove an instable portion thereof; and (2) a method in which the obtained oxymethylene copolymer is hydrolyzed in an aqueous medium to remove an instable portion thereof.

After the obtained oxymethylene copolymer is stabilized by one of these methods, it is pelletized to obtain a stabilized and moldable oxymethylene copolymer.

Out of the above methods, the method (1) is preferred as an industrial method because it is more simple in process than the method (2). That is, when the method (1) is used, it is preferred to melt knead an oxymethylene copolymer at (its melting temperature) to (its melting temperature +100° C.) and a pressure of 760 to 0.1 Torr ($1 \times 10^5$ to 13.3 Pa). When the treatment temperature is lower than the melting temperature of the oxymethylene copolymer, the decomposition of an instable portion becomes insufficient and a stabilization effect is not obtained. When the treatment temperature is higher than (melting temperature +100° C.), yellowing may occur, the main chain of the polymer may be decomposed by heat and an instable portion may be formed at the same time, thereby impairing heat stability. When the treatment pressure is higher than 760 Torr, the effect of removing a decomposition gas formed by the decomposition of the instable portion from the copolymer is low, thereby making it impossible to obtain a satisfactory stabilization effect. When the treatment pressure is lower than 0.1 Torr, an apparatus for obtaining such a low pressure is expensive which is industrially disadvantageous and a molten resin easily flows out from a suction vent port, thereby making it easy to cause an operation trouble.

A single-screw or double or more screw vented extruder may be used for the above stabilization treatment in the present invention. Two or more extruders may be connected in series to obtain a required residence time. For the stabilization treatment, an antioxidant and a stabilizer such as a heat stabilizer may be added to carry out a stabilization treatment when the oxymethylene copolymer is melt kneaded.

Examples of the antioxidant usable in the present invention include steric hindrance phenols such as triethylene glycol-bis-3-(3-t-butyl-4-hydroxy-5-methylphenyl) propionate and pentaerythrityl-tetrakis-3-(3,5-di-t-butyl-4-hydroxyphenyl)propionate. Examples of the heat stabilizer include amine-substituted triazines such as melamine, methylolmelamine, benzoguanamine, cyanoguanidine and N,N-diarylmelamine, polyamides, urea derivatives, urethanes, and inorganic acid salts, hydroxides and organic acid salts of sodium, potassium, calcium, magnesium and barium.

Additives such as a colorant, nucleating agent, plasticizer, release agent, antistatic agent such as polyethylene glycol or glycerine, ultraviolet light absorbent such as a benzotriazole-based or benzophenone-based compound and optical stabilizer such as a hindered amine-based compound maybe optionally added to the oxymethylene copolymer produced by the process of the present invention.

The process for producing an oxymethylene copolymer of the present invention is preferably the following process (I) or (II).

(I) A process for producing an oxymethylene copolymer by polymerizing trioxan and 1,3-dioxolan in the presence of a cationically active catalyst, wherein (1) 1,3-dioxolan is used in an amount of 1.1 to 2.9 mol %, preferably 1.1 to 2.5 mol % based on trioxan; and (2) the cationically active catalyst is used in an amount of $1.1 \times 10^{-7}$ to $1.2 \times 10^{-4}$ mol, preferably $1 \times 10^{-7}$ to $0.6 \times 10^{-4}$ mol based on 1 mol of trioxan.

(II) A process for producing an oxymethylene copolymer by polymerizing trioxan and 1,3-dioxolan in the presence of a cationically active catalyst, wherein (1) 1,3-dioxolan is used in an amount of 0.01 to 1.0 molt, preferably 0.1 to 0.8 molt based on trioxan; and (2) the cationically active catalyst is used in an amount of $1 \times 10^{-7}$ to $3 \times 10^{-5}$ mol, preferably $1 \times 10^{-7}$ to $2 \times 10^{-5}$ mol based on 1 mol of trioxan.

The following examples and comparative examples are provided for the purpose of further illustrating the present invention but are in no way to be taken as limiting. Terms and measurement methods in these examples and comparative examples are given below.

(1) continuous polymerizer: continuous;mixer having such an internal cross section that two circles partly overlap with each other, a diameter of the internal cross section of 20 cm, and a pair of shafts of the internal section of 144 cm in a long case having a jacket therearound, each of which is fitted with a large number of intermeshing pseudo-triangular plates so that the surfaces of pseudo-triangular plates and the inner surface of the case can be cleaned by the ends of pseudo-triangular plates paired with the above plates.

(2) polymerization yield: 20 g of a crude copolymer which has been subjected to a termination treatment is immersed in 20 ml of acetone, filtered, washed with acetone three times and vacuum dried until its weight becomes constant at 60° C. Thereafter, the crude copolymer is accurately weighed to determine polymerization yield from the following equation.

polymerization yield=$M_1/M_0 \times 100$ $M_0$: weight of copolymer before treatment with acetone (20 g)

$M_1$: weight of copolymer after treatment with acetone and drying (3) weight reduction by heating: A stabilizer (Irganox 245 (4.0%) of Ciba Geigy Co., Ltd.) is added to and mixed well with 2 g of a crude copolymer which has been dried at 60° C. under a reduced pressure of $10^{-2}$ Torr for 24 hours and let pass through a 60-mesh sieve, the resulting mixture is placed in a test tube whose inside is then substituted with nitrogen and heated at 222° C. under a reduced pressure of 10 Torr for 2 hours to obtain a weight reduction (%).

(4) intrinsic viscosity: A crude copolymer is dissolved in a p-chlorophenol solvent containing 2% of α-pynene to a concentration of 0.1 wt % to measure intrinsic viscosity at 60° C.

(5) mechanical properties: The flexural properties and tensile properties of an oxymethylene copolymer are measured in accordance with ASTM D790 and ASTM D638, respectively.

(6) residence heat stability: An oxymethylene copolymer is retained in a cylinder heated at a temperature of 240° C. for a certain period of time using an injection molding machine having a clamping force of 75 tons to measure a required residence time until a silver streak is formed. The greater the value the higher the heat stability becomes.

EXAMPLES 1 TO 6

An oxymethylene copolymer was produced using two of the above-described continuous polymerizer and a terminator (deactivator) mixer (continuous polymerizer having such a structure that a shaft is fitted with a large number of screw-like blades in place of the intermeshing pseudo-triangular plates and a terminator solution is injected from a feed port and continuously mixed with a polymer) which were connected in series. 80 kg/hr (889 kmol/hr) of trioxan, an amount shown in Table 1 of 1,3-dioxolan and boron trifluoride diethyl etherate as a catalyst were continuously supplied into the inlet of the first polymerizer. Methylal as a molecular weight modifier was continuously supplied in an amount of 500 ppm based on trioxan to adjust the intrinsic viscosity to 1.1 to 1.5 dl/g. The total amount of benzene was 1 wt % or less based on trioxan. Triphenylphosphine in the form of a benzene solution was continuously supplied from the inlet of the terminator mixer in an amount 2 times the number of mols of the catalyst used to terminate polymerization and an oxymethylene crude copolymer was obtained from the outlet. Polymerization operation was carried out by setting the shaft revolution of the continuous polymerizers to about 40 rpm, the jacket temperature of the first continuous polymerizer to 65° C. and the jacket temperature of the second continuous polymerizer and the jacket temperature of the terminator mixer to 40° C. The polymerization yield and weight reduction by heating of the obtained crude copolymer were measured and the obtained results are shown in Table 1. 0.3 part by weight of triethylene glycol-bis[3-(3-t-butyl-5-methyl-4-hydroxyphenyl)propionate] (Irganox 245 of Ciba Geigy Co., Ltd.), 0.1 part by weight of melamine and 0.05 part by weight of magnesium hydroxide were added to 100 parts by weight of the obtained crude copolymer and the resulting mixture was supplied to a double-screw vented extruder, melt kneaded at 200° C. under a reduced pressure of 160 Torr and pelletized. The residence heat stabilities of these pellets and the mechanical properties of test samples formed by injection molding were measured and the obtained results are shown in Table 1.

COMPARATIVE EXAMPLES 1 AND 2 AND REFERENCE EXAMPLE 1

The procedure of Examples 1 to 6 was repeated except that the catalyst (boron trifluoride diethyl etherate) was used in an amount shown in Table 1. When the Tenac 4010 of Asahi Chemical Industry, Co., Ltd. was used as an oxymethylene homopolymer (Reference Example 1), the mechanical properties and residence heat stability of the oxymethylene homopolymer were measured in the same manner as in Examples 1 to 6. The results are shown in Table 1.

EXAMPLES 7 TO 12

The procedure of Examples 1 to 6 was repeated except that 1,3-dioxolan and the catalyst (boron trifluoride diethyl etherate) were used in amounts shown in Table 1. The results are shown in Table 1.

COMPARATIVE EXAMPLES 3 AND 4

The procedure of Examples 7 to 12 was repeated except that the catalyst (boron trifluoride diethyl etherate) was used in an amount shown in Table 1. The results are shown in Table 1.

EXAMPLES 13 TO 15

The procedure of Examples 1 to 6 was repeated except that 1,3-dioxolan and the catalyst (boron trifluoride diethyl etherate) were used in amounts shown in Table 1. The results are shown in Table 1.

COMPARATIVE EXAMPLE 5

The procedure of Examples 13 to 15 was repeated except that 1,3-dioxolan and the catalyst (boron trifluoride diethyl etherate) were used in amounts shown in Table 1. The results are shown in Table 1.

TABLE 1

| | amount of TOX (mols/hr) | amount of DOL | | amount of catalyst | | properties of crude copolymer | | mechanical properties | | | | residence |
| | | (mols/hr) | (DOL based on TOX) | (mols/hr) | (catalyst/TOX) (molar ratio) | polymerization yield (wt %) | weight reduction by heating (wt %) | flexural strength (MPa) | flexural modulus (GPa) | tensile strength (MPa) | tensile elongation (%) | heat stability (min) |
|---|---|---|---|---|---|---|---|---|---|---|---|---|
| Ex. 1 | 889 | 13.3 | 1.5 | 0.00133 | $1.50 \times 10^{-6}$ | 91 | 1.0 | 102.0 | 2.90 | 67.7 | 50 | 60 |
| Ex. 2 | 889 | 13.3 | 1.5 | 0.00665 | $7.48 \times 10^{-6}$ | 95 | 1.2 | 102.0 | 2.90 | 67.7 | 50 | 60 |
| Ex. 3 | 889 | 13.3 | 1.5 | 0.01334 | $1.50 \times 10^{-5}$ | 97 | 1.7 | 102.0 | 2.90 | 67.7 | 50 | 60 |

TABLE 1-continued

|  | amount of TOX (mols/hr) | amount of DOL | | amount of catalyst | | properties of crude copolymer | | mechanical properties | | | | residence |
|---|---|---|---|---|---|---|---|---|---|---|---|---|
|  |  | (mols/hr) | (DOL based on TOX) | (mols/hr) | (catalyst/TOX) (molar ratio) | polymerization yield (wt %) | weight reduction by heating (wt %) | flexural strength (MPa) | flexural modulus (GPa) | tensile strength (MPa) | tensile elongation (%) | heat stability (min) |
| Ex. 4 | 889 | 13.3 | 1.5 | 0.02667 | $3.00 \times 10^{-5}$ | 98 | 2.2 | 102.0 | 2.90 | 67.7 | 50 | 50 |
| Ex. 5 | 889 | 13.3 | 1.5 | 0.04001 | $4.50 \times 10^{-5}$ | 99 | 3.5 | 102.0 | 2.90 | 67.7 | 50 | 50 |
| Ex. 6 | 889 | 13.3 | 1.5 | 0.05334 | $6.00 \times 10^{-5}$ | 99 | 5.7 | 102.0 | 2.90 | 67.7 | 50 | 40 |
| C. Ex. 1 | 889 | 13.3 | 1.5 | 0.00120 | $1.35 \times 10^{-6}$ | 85 | 0.8 | 102.0 | 2.90 | 67.7 | 50 | 60 |
| C. Ex. 2 | 889 | 13.3 | 1.5 | 0.06668 | $7.50 \times 10^{-5}$ | 99 | 10.7 | 102.0 | 2.90 | 67.7 | 50 | 10 |
| R. Ex. 1 |  |  | Tenac 4010 |  |  | — | — | 103.0 | 3.00 | 69.7 | 25 | 30 |
| Ex. 7 | 889 | 17.8 | 2.0 | 0.00178 | $2.00 \times 10^{-6}$ | 91 | 0.9 | 100.0 | 2.85 | 66.7 | 55 | 60 |
| Ex. 8 | 889 | 17.8 | 2.0 | 0.00889 | $1.00 \times 10^{-5}$ | 95 | 1.1 | 100.0 | 2.85 | 66.7 | 55 | 60 |
| Ex. 9 | 889 | 17.8 | 2.0 | 0.01778 | $2.00 \times 10^{-5}$ | 97 | 1.6 | 100.0 | 2.85 | 66.7 | 55 | 60 |
| Ex. 10 | 889 | 17.8 | 2.0 | 0.03556 | $4.00 \times 10^{-5}$ | 98 | 2.1 | 100.0 | 2.85 | 66.7 | 55 | 50 |
| Ex. 11 | 889 | 17.8 | 2.0 | 0.05334 | $6.00 \times 10^{-5}$ | 99 | 3.3 | 100.0 | 2.85 | 66.7 | 55 | 50 |
| Ex. 12 | 889 | 17.8 | 2.0 | 0.07112 | $8.00 \times 10^{-5}$ | 99 | 5.5 | 100.0 | 2.85 | 66.7 | 55 | 40 |
| C. Ex. 3 | 889 | 17.8 | 2.0 | 0.00142 | $1.60 \times 10^{-6}$ | 85 | 0.7 | 100.0 | 2.85 | 66.7 | 55 | 60 |
| C. Ex. 4 | 889 | 17.8 | 2.0 | 0.08890 | $1.00 \times 10^{-4}$ | 99 | 10.2 | 100.0 | 2.85 | 66.7 | 55 | 10 |
| Ex. 13 | 889 | 9.8 | 1.1 | 0.03912 | $4.40 \times 10^{-5}$ | 99 | 5.9 | 103.0 | 3.00 | 67.7 | 50 | 40 |
| Ex. 14 | 889 | 22.2 | 2.5 | 0.08890 | $1.00 \times 10^{-4}$ | 99 | 5.3 | 98.0 | 2.80 | 65.7 | 55 | 40 |
| Ex. 15 | 889 | 25.8 | 2.9 | 0.10312 | $1.16 \times 10^{-4}$ | 99 | 5.1 | 97.0 | 2.75 | 65.4 | 60 | 40 |
| C. Ex. 5 | 889 | 31.1 | 3.5 | 0.12446 | $1.40 \times 10^{-4}$ | 98 | 4.6 | 94.0 | 2.70 | 63.7 | 60 | 40 |

Ex.: Example  C. Ex.: Comparative Example  R. Ex.: Reference Example
Notes)
TOX: trioxan
DOL: 1,3-dioxolan

EXAMPLES 16 TO 20

An oxymethylene copolymer was produced using two of the above-described continuous polymerizer and a terminator (deactivator) mixer (continuous polymerizer having such a structure that a shaft is fitted with a large number of screw-like blades in place of the intermeshing pseudo-triangular plates and a terminator solution is injected from a feed port and continuously mixed with a polymer) which were connected in series. 80 kg/hr (889 kmol/hr) of trioxan, an amount shown in Table 2 of 1,3-dioxolan and boron trifluoride diethyl etherate as a catalyst were continuously supplied into the inlet of the first polymerizer. Methylal as a molecular weight modifier was continuously supplied in an amount of 500 ppm base on trioxan to adjust the intrinsic viscosity to 1.1 to 1.5 dl/g. The total amount of benzene was 1 wt % or less based on trioxan. Triphenylphosphine in the form of a benzene solution was continuously supplied from the inlet of the terminator mixer in an amount 2 times the number of mols of the catalyst used to terminate polymerization and an oxymethylene crude copolymer was obtained from the outlet. Polymerization operation was carried out by setting the shaft revolution of the continuous polymerizers to about 40 rpm, the jacket temperature of the first continuous polymerizer to 65° C. and the jacket temperature of the second continuous polymerizer and the jacket temperature of the terminator mixer to 40° C. The polymerization yield and weight reduction by heating of the obtained crude copolymer were measured and the obtained results are shown in Table 2. 0.3 part by weight of triethylene glycol-bis[3-(3-t-butyl-5-methyl-4-hydroxyphenyl)propionate] (Irganox 245 of Ciba Geigy Co., Ltd.), 0.1 part by weight of melamine and 0.05 part by weight of magnesium hydroxide were added to 100 parts by weight of the obtained crude copolymer and the resulting mixture was supplied to a double-screw vented extruder, melt kneaded at 200° C. under a reduced pressure of 160 Torr and pelletized. The residence heat stabilities of these pellets and the mechanical properties of test samples formed by injection molding were measured and the obtained results are shown in Table 2.

COMPARATIVE EXAMPLE 6

The procedure of Examples 16 to 20 was repeated except that the catalyst (boron trifluoride diethyl etherate) was used in an amount shown in Table 2. The results are shown in Table 2.

EXAMPLES 21 TO 25

The procedure of Examples 16 to 20 was repeated except that 1,3-dioxolan and the catalyst (boron trifluoride diethyl etherate) were used in amounts shown in Table 2. The results are shown in Table 2.

COMPARATIVE EXAMPLE 7

The procedure of Examples 21 to 25 was repeated except that the catalyst (boron trifluoride diethyl etherate) was used in an amount shown in Table 2. The results are shown in Table 2.

EXAMPLES 26 TO 28

The procedure of Examples 16 to 20 was repeated except that 1,3-dioxolan and the catalyst (boron trifluoride diethyl etherate) were used in amounts shown in Table 2. The results are shown in Table 2.

COMPARATIVE EXAMPLE 8

The procedure of Examples 26 to 28 was repeated except that 1,3-dioxolan and the catalyst (boron trifluoride diethyl etherate) were used in amounts shown in Table 2. The results are shown in Table 2.

TABLE 2

| | amount of TOX (mols/hr) | amount of DOL | | amount of catalyst | | properties of crude copolymer | | mechanical properties | | | | residence heat stability (min) |
|---|---|---|---|---|---|---|---|---|---|---|---|---|
| | | (mols/hr) | (DOL based on TOX) | (mols/hr) | (catalyst/TOX) (molar ratio) | polymerization yield (wt %) | weight reduction by heating (wt %) | flexural strength (MPa) | flexural modulus (GPa) | tensile strength (MPa) | tensile elongation (%) | |
| Ex. 16 | 889 | 2.67 | 0.3 | $8.89 \times 10^{-5}$ | $0.01 \times 10^{-5}$ | 91 | 1.0 | 103.0 | 3.00 | 68.7 | 50 | 60 |
| Ex. 17 | 889 | 2.67 | 0.3 | $8.89 \times 10^{-4}$ | $0.01 \times 10^{-4}$ | 96 | 1.2 | 103.0 | 3.00 | 68.7 | 50 | 60 |
| Ex. 18 | 889 | 2.67 | 0.3 | $8.89 \times 10^{-3}$ | $0.01 \times 10^{-3}$ | 98 | 1.7 | 103.0 | 3.00 | 68.7 | 50 | 60 |
| Ex. 19 | 889 | 2.67 | 0.3 | $1.78 \times 10^{-2}$ | $0.02 \times 10^{-3}$ | 99 | 2.2 | 103.0 | 3.00 | 68.7 | 50 | 50 |
| Ex. 20 | 889 | 2.67 | 0.3 | $2.67 \times 10^{-2}$ | $0.03 \times 10^{-3}$ | 99 | 3.5 | 103.0 | 3.00 | 68.7 | 50 | 50 |
| C. Ex. 6 | 889 | 2.67 | 0.3 | $7.11 \times 10^{-5}$ | $0.008 \times 10^{-5}$ | 85 | 0.8 | 103.0 | 3.00 | 68.7 | 50 | 60 |
| Ex. 21 | 889 | 7.11 | 0.8 | $8.89 \times 10^{-5}$ | $0.01 \times 10^{-5}$ | 91 | 0.9 | 103.0 | 3.00 | 68.7 | 50 | 60 |
| Ex. 22 | 889 | 7.11 | 0.8 | $8.89 \times 10^{-4}$ | $0.01 \times 10^{-4}$ | 96 | 1.1 | 103.0 | 3.00 | 68.7 | 50 | 60 |
| Ex. 23 | 889 | 7.11 | 0.8 | $8.89 \times 10^{-3}$ | $0.01 \times 10^{-3}$ | 98 | 1.6 | 103.0 | 3.00 | 68.7 | 50 | 60 |
| Ex. 24 | 889 | 7.11 | 0.8 | $1.78 \times 10^{-2}$ | $0.02 \times 10^{-3}$ | 99 | 2.1 | 103.0 | 3.00 | 68.7 | 50 | 50 |
| Ex. 25 | 889 | 7.11 | 0.8 | $2.67 \times 10^{-2}$ | $0.03 \times 10^{-3}$ | 99 | 3.3 | 103.0 | 3.00 | 68.7 | 50 | 50 |
| C. Ex. 7 | 889 | 7.11 | 0.8 | $7.11 \times 10^{-5}$ | $0.008 \times 10^{-5}$ | 85 | 0.7 | 103.0 | 3.00 | 68.7 | 50 | 60 |
| Ex. 26 | 889 | 0.44 | 0.05 | $8.89 \times 10^{-4}$ | $0.01 \times 10^{-4}$ | 99 | 2.1 | 103.0 | 3.00 | 68.7 | 50 | 50 |
| Ex. 27 | 889 | 4.45 | 0.5 | $8.89 \times 10^{-4}$ | $0.01 \times 10^{-4}$ | 96 | 1.2 | 103.0 | 3.00 | 68.7 | 50 | 60 |
| Ex. 28 | 889 | 8.89 | 1.0 | $8.89 \times 10^{-4}$ | $0.01 \times 10^{-4}$ | 94 | 0.9 | 103.0 | 3.00 | 68.7 | 50 | 60 |
| C. Ex. 8 | 889 | 0.07 | 0.008 | $8.89 \times 10^{-4}$ | $0.01 \times 10^{-4}$ | 99 | 10.1 | 103.0 | 3.00 | 68.7 | 30 | 10 |

Ex.: Example  C. Ex.: Comparative Example
Notes)
TOX: trioxan
DOL: 1,3-dioxolan

Effect of the Invention

The process for producing an oxymethylene copolymer of the present invention makes it possible to obtain at a high yield an oxymethylene copolymer having almost as high mechanical strength and stiffness as an oxymethylene homopolymer while retaining the tenacity and heat stability of an oxymethylene copolymer.

What is claimed is:

1. A process for producing an oxymethylene copolymer by polymerizing trioxan and 1,3-dioxolan in the presence of a cationically active catalyst, wherein (1) 1,3-dioxolan is used in an amount of 0.5 to 2.0 mol % based on trioxan; and (2) the cationically active catalyst is used in an amount of $1 \times 10^{-7}$ up to $1 \times 10^{-4}$ mol based on 1 mol of trioxan; and (3) triphenylphosphine as a polymerization terminator is added when the polymerization yield reaches 90% or more.

2. The process for producing an oxymethylene copolymer according to claim 1, wherein the cationically active catalyst is boron trifluoride or coordination compound thereof.

3. The process for producing an oxymethylene copolymer according to claim 1, wherein the obtained oxymethylene copolymer is stabilized by a stabilization treatment.

4. The process for producing an oxymethylene copolymer according to claim 3, wherein the stabilization treatment is carried out by melt kneading the oxymethylene copolymer at a temperature ranging from the melting temperature of the oxymethylene copolymer to (the melting temperature+100)° C. under a pressure of 760 to 0.1 Torr ($1 \times 10^5$ to 13.3 Pa).

* * * * *